United States Patent [19]

Thoroughman

[11] Patent Number: 5,150,996

[45] Date of Patent: Sep. 29, 1992

[54] KEYWAY BROACH GUIDE ASSEMBLY

[76] Inventor: Glenn R. Thoroughman, 4925 Finance Way, Kingman, Ariz. 86401

[21] Appl. No.: 739,186

[22] Filed: Aug. 1, 1991

[51] Int. Cl.$^5$ .............................................. B23D 37/04
[52] U.S. Cl. .................................... 409/259; 409/304
[58] Field of Search ............... 409/259, 260, 261, 278, 409/279, 304, 307

[56] References Cited

U.S. PATENT DOCUMENTS

| | | | |
|---|---|---|---|
| 131,293 | 9/1872 | Mooney | 409/304 |
| 870,971 | 11/1907 | Lindstrom | 405/307 |
| 4,284,377 | 8/1981 | Piper | 409/307 X |
| 4,810,140 | 3/1989 | Copen | 409/259 |

FOREIGN PATENT DOCUMENTS

| | | | |
|---|---|---|---|
| 8587 | 1/1977 | Japan | 409/259 |
| 659299 | 4/1979 | U.S.S.R. | 409/259 |
| 1514513 | 10/1989 | U.S.S.R. | 409/259 |

Primary Examiner—William Briggs
Attorney, Agent, or Firm—John Edward Roethel

[57] ABSTRACT

A broaching bushing for guiding a broaching tool in a workpiece bore during the cutting of a keyway of in an annular surface of the bore. The bushing having two main components: a wedge-shaped member and a broaching tool guide member positionable in longitudinally abutting relation to one another to form a broaching bushing of substantially rectangular cross section for insertion in the workpiece bore. The width of the rectangular cross-section is adjusted to tightly fit the bore by the longitudinal shifting of the wedge and guide members relative to one another. The bushing is sizable to fit into a plurality of standard bores or non-standard undersize or oversize bores.

10 Claims, 2 Drawing Sheets

KEYWAY BROACH GUIDE ASSEMBLY

This invention relates to a keyway broach guide assembly for guiding a keyway broach during the cutting of a keyway in an annular surface of a circular bore in a workpiece.

BACKGROUND OF THE INVENTION

To facilitate the cutting of a keyway in an annular surface of a bore in a workpiece, such as a wheel hub, a pulley hub, collar or sleeve, a broaching bushing is used to support and guide a broach through the workpiece bore. Standard broaching bushings used in most machine shops are round bushings that fit only one size bore. To do all standard size bores, a shop may have to have a large inventory of broaching bushings of different sizes. In addition to the standard size broaching bushings, more bushings may be needed to accommodate bores that are slightly undersize or oversize.

As noted in U.S. Pat. No. 2,510,835 issued Jun. 6, 1950 to A.E. Rice for a Broaching Tool, "In actual practice, a set of broaching elements and guide elements are provided, whereby the operator has a large selection of tools for accommodating workpieces of various sizes and various dimensioned keyway slots."

U.S. Pat. No. 870,971 issued Nov. 12, 1907 to C. Lindstrom for A Device for Cutting Key Seats or the Like was an early disclosure of the use of a elongated guide block of uniform cylindrical dimension throughout its length in form sized to fit into the circular bore in which a keyway was to be cut. The patent suggests that various means, such as a wedge, could be used to firmly lock the guide block in place. The use of the wedge is said to permit the guide block to be used in bores of different diameters. The cylindrical guide block being of uniform dimension, is therefore of uniform circular cross section throughout its length. The placement of the guide block cylindrical surface against an annular interior surface of the workpiece bore, especially when the diameter of the bore is substantially larger than the diameter of the guide block, presents difficulty in aligning the broaching bushing with the axis of the bore and in centering the broaching bushing in the bore.

Accordingly, it is an object of the present invention to provide a broaching bushing assembly the width of which is adjustable to fit a wide range of workpiece bore sizes including bores in which standard size cannot be used because the bore is undersized or oversized.

It is a further object to provide a broaching bushing assembly that includes a wedge shaped member and a broach guide member coacting to form an adjustable broaching bushing assembly having four corner edges which, when placed in contact with diametrically opposite sides of the annular surface of the workpiece bore, align the broach bushing assembly parallel to the axis of the bore and centered in the bore.

It is a further object of the present invention of the present invention to provide a broach bushing assembly in which the broach guide member and the wedge member are longitudinally adjustable relative to one another to size the bushing assembly lateral cross section to fit tightly in the workpiece bore.

It is yet a further object of the present invention to provide a broach bushing assembly in which the abutting sides of the guide member and the wedge member have a longitudinally engageable slot and follower interengagement to prevent lateral displacement of the guide member and wedge member during insertion in the bore and during longitudinal adjustment movements.

It is a further object to provide a broach bushing assembly in which the wedge member has a friction strip on its side engageable with the annular surface of the workpiece to hold the wedge member in place in the bore after preliminary sizing of the assembly in the bore and during final adjustment of the position of the guide member to tightly fit the assembly in the bore.

These and other objects of the present invention will be apparent from the following disclosure of a preferred embodiment of the present invention.

SUMMARY OF THE INVENTION

According to the present invention, the keyway broach guide assembly has two main components, an elongate guide member and an equally elongate wedge member. The guide member is of substantially rectangular cross section having on one side a longitudinally extending broach guide slot. On its side opposite the guide slot, the guide member is angularly inclined from end to end. The wedge member is tapered at an angle complementary to the angle of inclination of the inclined side of the guide member. The wedge member and guide member when placed with their complementary angled sides in abutting relation are longitudinally adjustable to provide a keyway broach guide assembly having a cross-sectional width that can be tightly fit into a circular bore into which a keyway will be cut.

BRIEF DESCRIPTION OF THE DRAWINGS

A specific embodiment of the present invention will now be described, by way of example only, with reference to the accompanying drawings, in which.

DESCRIPTION OF THE PREFERRED EMBODIMENT

Figure 1:
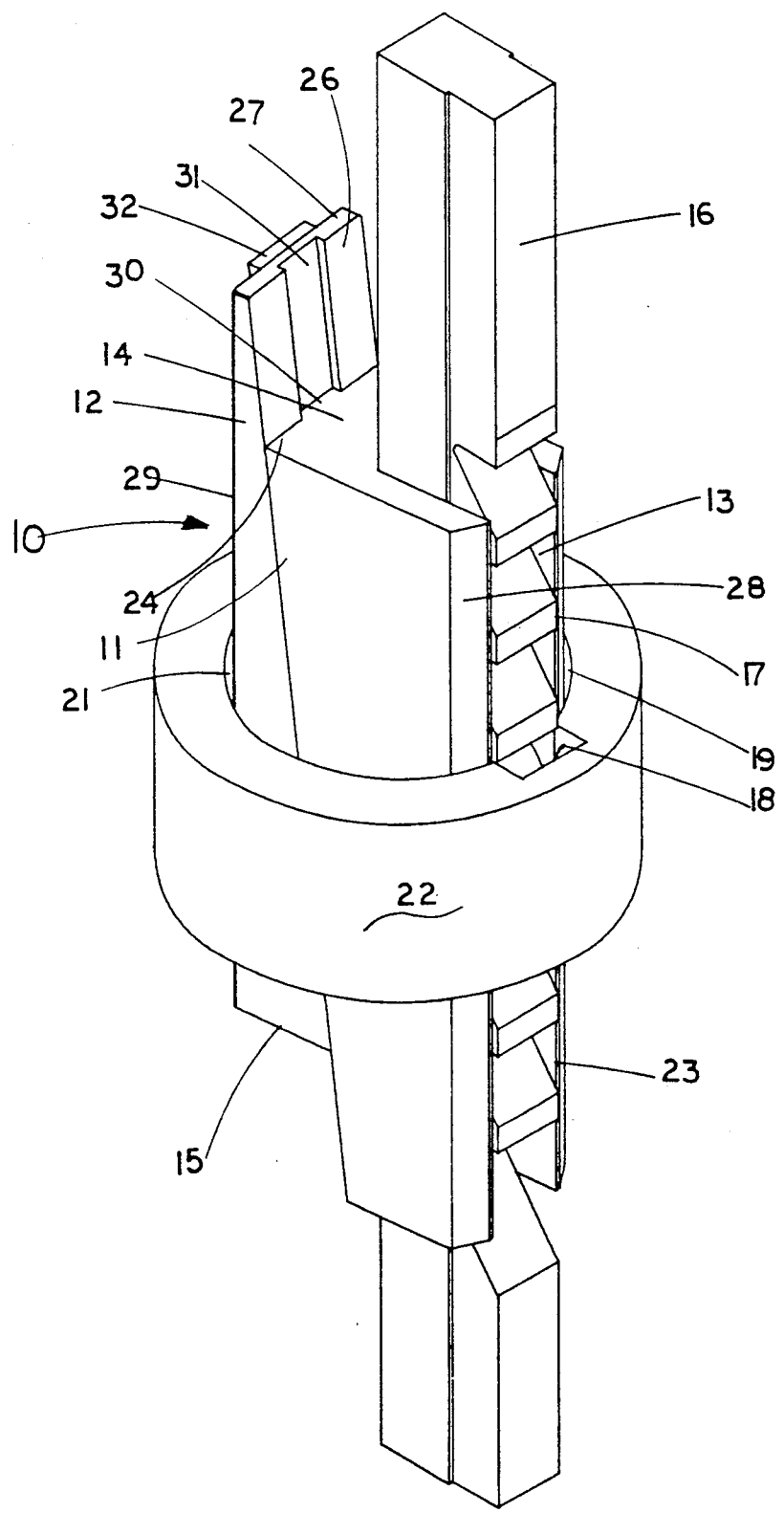
FIG. 1 is a perspective view of a keyway broach guide assembly inserted into a workpiece bore for guiding a keyway broach during the cutting of an internal keyway in an annular surface of the bore.

Referring now to the drawings, the keyway broach assembly, generally designated 10, comprises an elongate broach bushing, hereinafter to as guide member 11, and an equally elongate coacting wedge member 12. The guide member 11 has a broaching tool guide slot 13 that extends the length of the guide member 11 from its top end 14 to its bottom end 15. The top end 14 is so designated since it is the end at which a broaching tool 16 is entered into the guide slot 13.

The broach guide slot 13 is sized to accommodate a broaching tool 16 having broach teeth 17 for cutting an internal keyway 18 in an annular surface 19 of a bore 21 in a workpiece 22, as best seen in FIG. 1.

Figure 2:
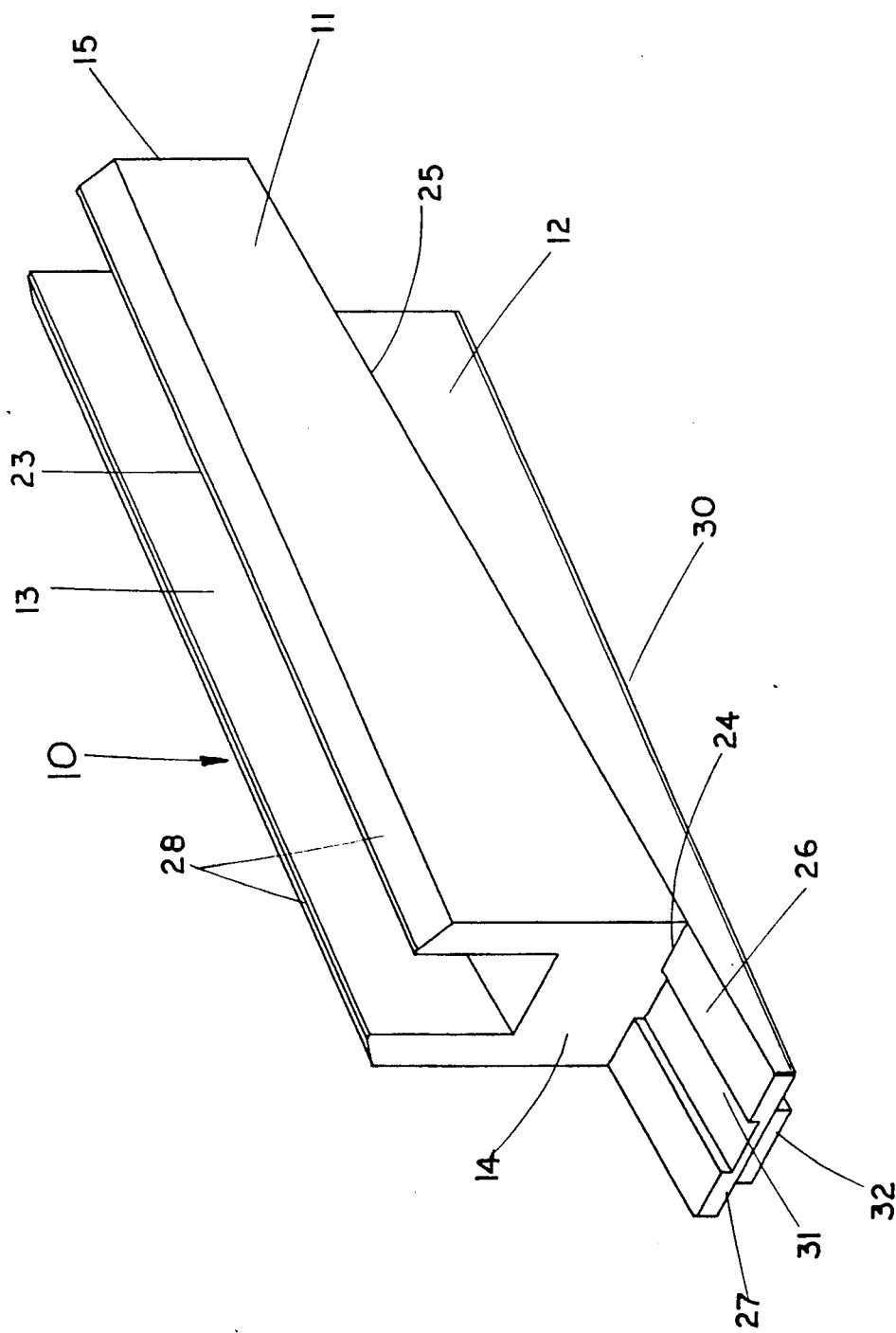
FIG. 2 is a perspective view of the keyway broach guide assembly.

The guide member 11 preferably is machined from a four sided, rectangular, metal block; a first side 23 of which is provided with the broaching tool guide slot 13. The second side 24, the side opposite the slotted side 23, is angularly inclined or tapered at an acute angle along the line 25 so that the guide member 11 is of declining thickness from its top end 14 to its bottom end 15, as best seen in FIG. 2.

The wedge member 12 has a first side 26 and a second side 27. The first side 26 is tapered at an angle complementary to the acute angle of the second side 24 of the guide member 11. As best seen in FIG. 2, when the angled second side 24 of the guide member is placed in abutting relation to the first side 26 of the wedge member 12, the plane of the slotted side 23 of the guide member 12 is parallel to the plane of the second side 27 of the wedge member 12. The keyway broach guide assembly 10 then functionally has a rectangular cross section that can be sized to fit into the bore of the workpiece in which the keyway is to be cut.

The guide member 11 has chamfered corners 28 extending laterally from the broaching tool slot 13. The wedge member 12 has small radii corners 29 along its edges expected to engage the annular surface of the workpiece bore. The chamfered corners 28 on the guide member 11 provide clearance between the edge portions of the guide member outwardly of the broaching tool slot 13 and the curvature of the annular surface 19 of the work piece bore 21. This permits the broaching guide member guide slot face to be positioned close to the annular bore surface in which the keyway is to be cut for a range of small to large bores. The rounded corners 29 on the wedge member 12 are provided to prevent the annular surfaces from being scratched during the final tight fitting of the broach bushing assembly 10 into the workpiece bore. The chamfers 28 bearing on the annular surface of the workpiece bore serve further to stabilize the guide member 11 as the keyway is being cut.

Also, the guide member 11 angularly inclined side 24 preferably is provided with a longitudinal centered rib 30 adapted to fit into a longitudinally centered groove or slot 31 in the wedge member side 26. When the guide member 11 and the wedge member 12 are placed into abutting relation with each other, the rib 30 and groove 31 function to maintain the guide member and wedge member longitudinally centered on each other during insertion into the workpiece bore and during longitudinal adjustment movements while in the bore.

Although barely visible in the drawings, a friction strip 32 of rubber or other friction material is centered on and extends the length of the wedge member 12 side 27. The friction strip 32 is preferably provided to hold the wedge means 12 against movement axially of the bore during the final fitting of the keyway broaching assembly 10 into the workpiece bore.

Although the wedge member 12 is shown in the drawing as being of the same width as the guide member 11, it could be slightly smaller or larger, if desired, without affecting the utility of the broaching bushing assembly 10.

In operation, the workpiece 22 is placed on an apertured support plate (not shown). The guide member 11 and the wedge member 12 are placed in abutting relation to each other, see FIG. 2. The guide member 11 and the wedge member 12 ar longitudinally adjusted to provide a lateral cross-sectional width that would fit within a circumscribed circle approximating the diameter of the bore 21 in the workpiece 22.

Upon insertion of the pre-assembled guide member 11 and wedge member 12 into the workpiece bore 21, the chamfered corners 28 would be positioned so that the broaching tool guide slot 13 would face against the annular surface in which the keyway 18 was to be cut. The corners 29 of the wedge member would abut the opposite side of the annular surface of the workpiece bore. The friction strip 32 when positioned between the wedge member face 27 and the annular surface of the bore 21 opposite the keyway location will hold the wedge member 12 against vertical displacement as the guide member 11 is tapped downwardly to incrementally enlarge the lateral width of the keyway broach guide assembly 10 to make a tight fit of the assembly in the workpiece bore 21. At the same time that the keyway broach guide assembly 10 is being tightly fitted into the bore, the engagement of the chamfered corners 28 of the guide member 11 and the rounded corners 29 with the annular surfaces of the bore 21 results in the keyway broach guide assembly being aligned with the axis of the bore and being substantially centered in the bore.

With the keyway broach guide assembly 10 in position in the workpiece bore, the broaching tool 16 can be inserted in the guide slot 13 to be driven in a direction to cause the broach teeth 17 to cut the keyway. Following conventional practice, the depth of the keyway cut can be controlled by the placement of shims (not shown) behind the broaching tool.

While the invention has been illustrated with respect to a specific embodiment thereof, this embodiment should be considered illustrative rather than limiting. Various modification and modifications may be made and will be apparent to those skilled in the art. Accordingly, the invention should not be limited by the foregoing description, but rather should be defined only by the following claims.

I claim:

1. A broaching bushing means for guiding a broaching tool in a workpiece bore during the cutting of a keyway in an annular surface of the bore, consisting of:
   an elongated wedge member and a broaching tool elongated guide member positionable in longitudinally abutting relation to one another to form a bushing means of substantially rectangular cross section for insertion in a workpiece bore,
   the wedge member and the guide member each having a first side and a second side opposite the first side,
   the first sides of each member having complementarily inclined surfaces which, when in abutting relationship, position the second side in parallel relationship to each other,
   the wedge member and the guide member being longitudinally movable relative to one another to adjust the distance between the parallel sides of the bushing means,
   wherein the rectangular cross section of the bushing means is adjustable to fit various sized bores.

2. A keyway broach guide assembly for guiding a keyway broach during the cutting of a keyway in an annular surface of a circular bore in a workpiece, comprising:
   an elongate guide member and an elongate wedge member,
   the guide member having a first side and a second side opposite the first side,
   an outwardly facing broach guide slot extending the length of the first side of the guide member for slidably guiding a keyway broach against an annular surface of the circular bore during the cutting of a keyway,
   the second side of the guide member being at an angle to the first side of the guide member for the length of the guide member,
   the wedge member having a first side and a second side with the first side being tapered at an angle complementary to the angle of the second side of the guide member, the wedge member and the guide member when fitted together with their angled sides in abutting complementary relationship providing a keyway broach guide having a substantially rectangular cross section, the wedge member and guide member being longitudinally adjustable relative to one another for incrementally sizing the cross-sectional width of the broach guide assembly after insertion into the circular bore to provide a keyway broach guide assembly having a cross-sectional width that will tightly fit into the circular bore in which the keyway is to be cut.

3. A broaching bushing means according to claim 1, in which:

the rectangular cross section of the bushing means provides four corner edges which when placed in contact with diametrically opposite sides of the annular surface of the bore align the bushing means parallel to the axis of the bore and centered in the bore.

4. A broaching bushing means according to claim 1, in which:

the second side of the guide member has an outwardly facing broaching tool guide slot extending the length of the guide member, the guide member having laterally facing chamfers on its second side outwardly of the guide slot, the chamfers on the guide member providing clearance between the edge portions of the guide member outwardly of the guide slot and the curvature of the annular surface of the bore, wherein when the broaching bushing means is in the workpiece bore the guide slot is positioned close to the bore surface.

5. A broaching means according to claim 1, in which:

a longitudinally extending friction strip is centrally attached to the second side of the wedge member, the friction strip being engageable with the annular surface of the circular bore to hold the wedge member against displacement during longitudinal adjustment of the guide member on the wedge member.

6. A broaching means according to claim 1, in which:

the wedge member first side and the guide member first side have longitudinally interengaged slot and follower means for maintaining the wedge member and the guide member longitudinally centered against lateral displacement from each other during insertion in the workpiece bore and during longitudinal adjustment movements.

7. A keyway broach guide assembly according to claim 2, in which:

a longitudinally extending friction strip is centrally attached to the side of the wedge member opposite its tapered side, the friction strip being engageable with the annular surface of the circular bore to hold the wedge member against displacement during incremental adjustment of the guide member on the wedge member.

8. A keyway broach guide assembly according to claim 2, in which:

the guide member has outwardly chamfered corner edges paralleling the guide slot and the wedge member has rounded corner edges extending the length of its second side, the corner edges when in contact with the annular surfaces of the circular bore align the keyway broach guide assembly in a position parallel to and centered in the bore.

9. A keyway broach guide assembly according to claim 2, in which:

the guide member is incrementally adjustable on the wedge member to increase the pressure of the guide member side having the guide slot therein against the annular surface in which the keyway is to be cut.

10. A keyway broach guide assembly according to claim 9, in which:

the wedge member tapered side and the guide member angled side have longitudinally interengaged slot and follower means for maintaining the wedge member and the guide member longitudinally centered against lateral displacement from each other during insertion in the bore and during longitudinal adjustment movements.

* * * * *